United States Patent Office 3,191,749
Patented June 29, 1965

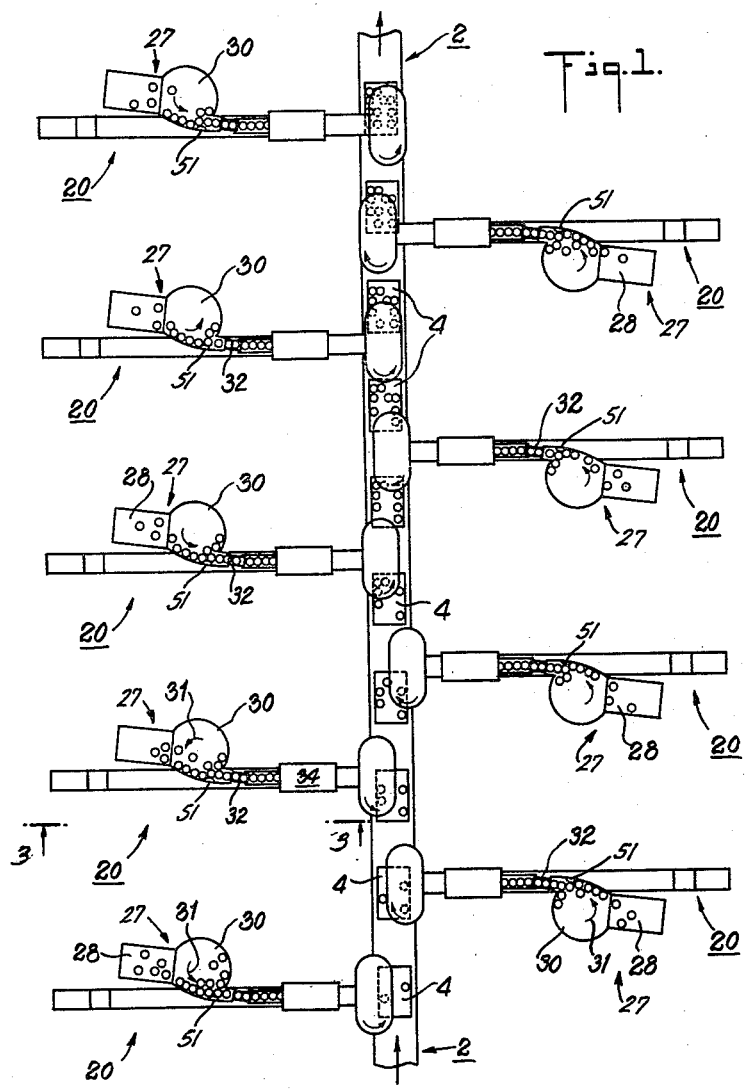

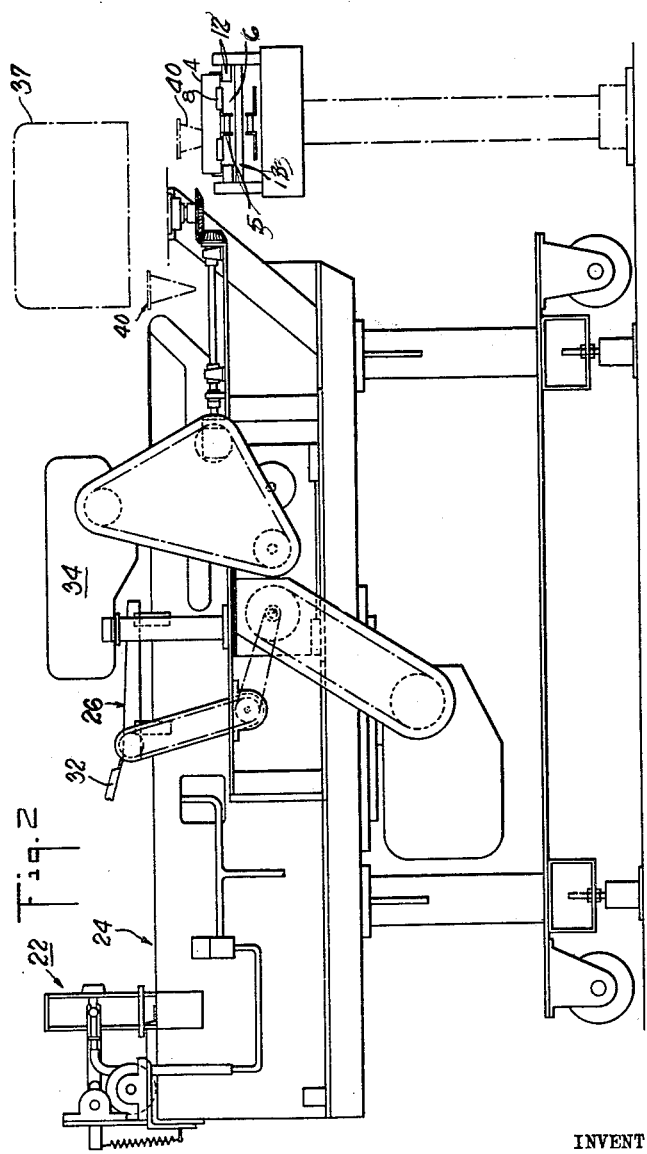

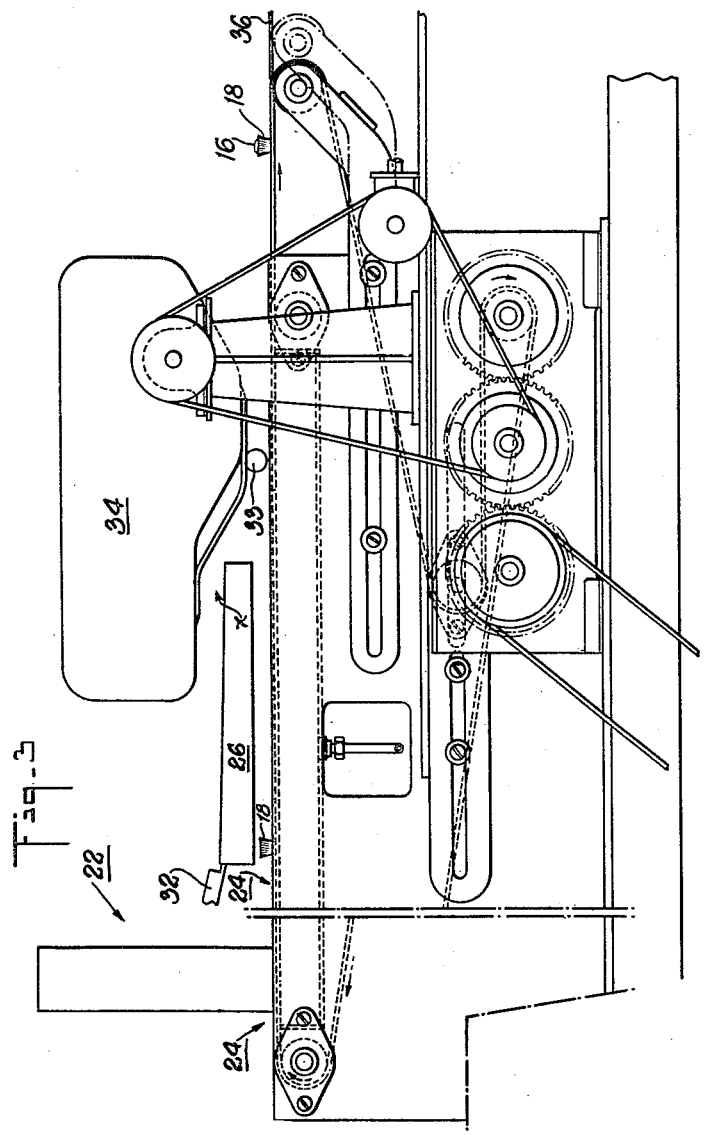

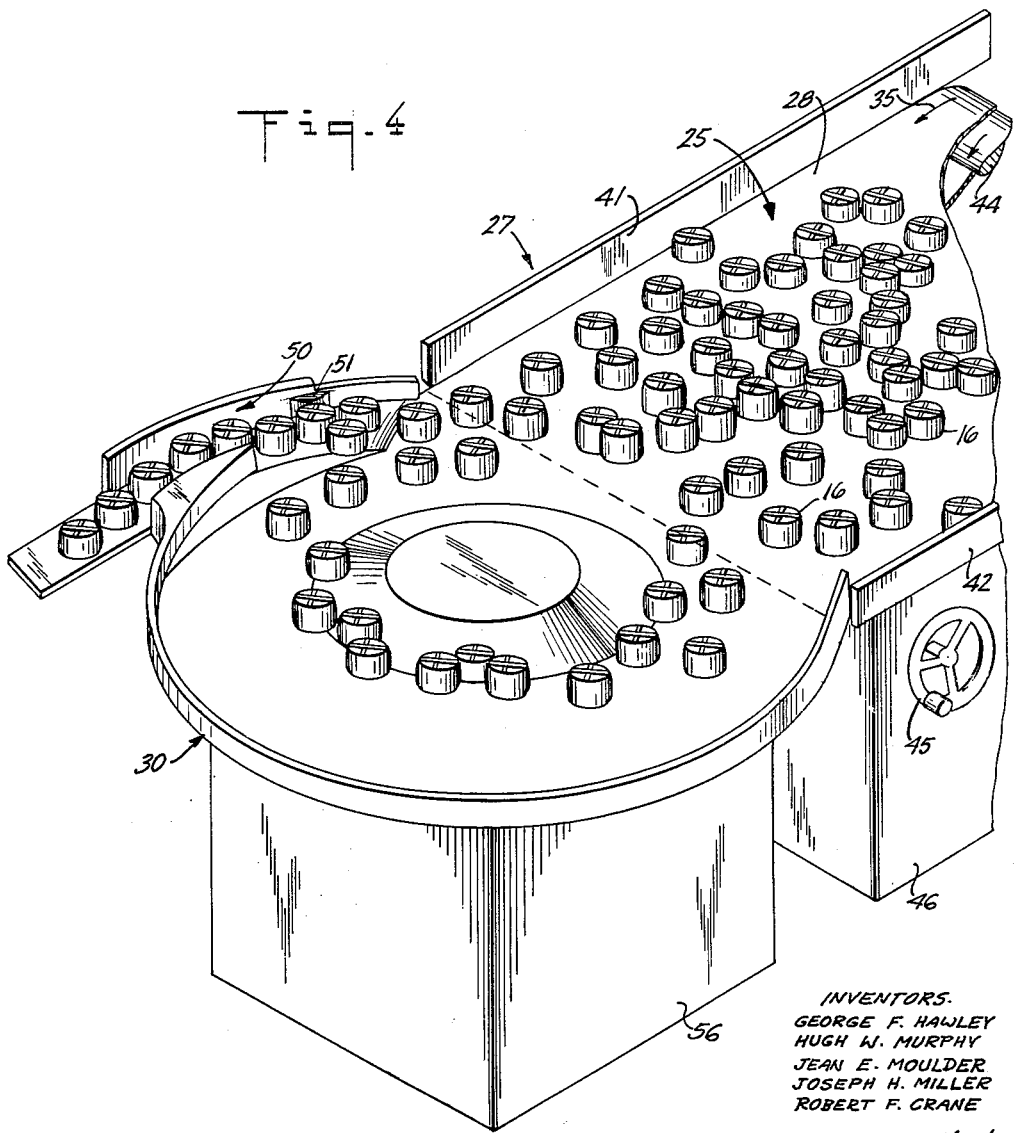

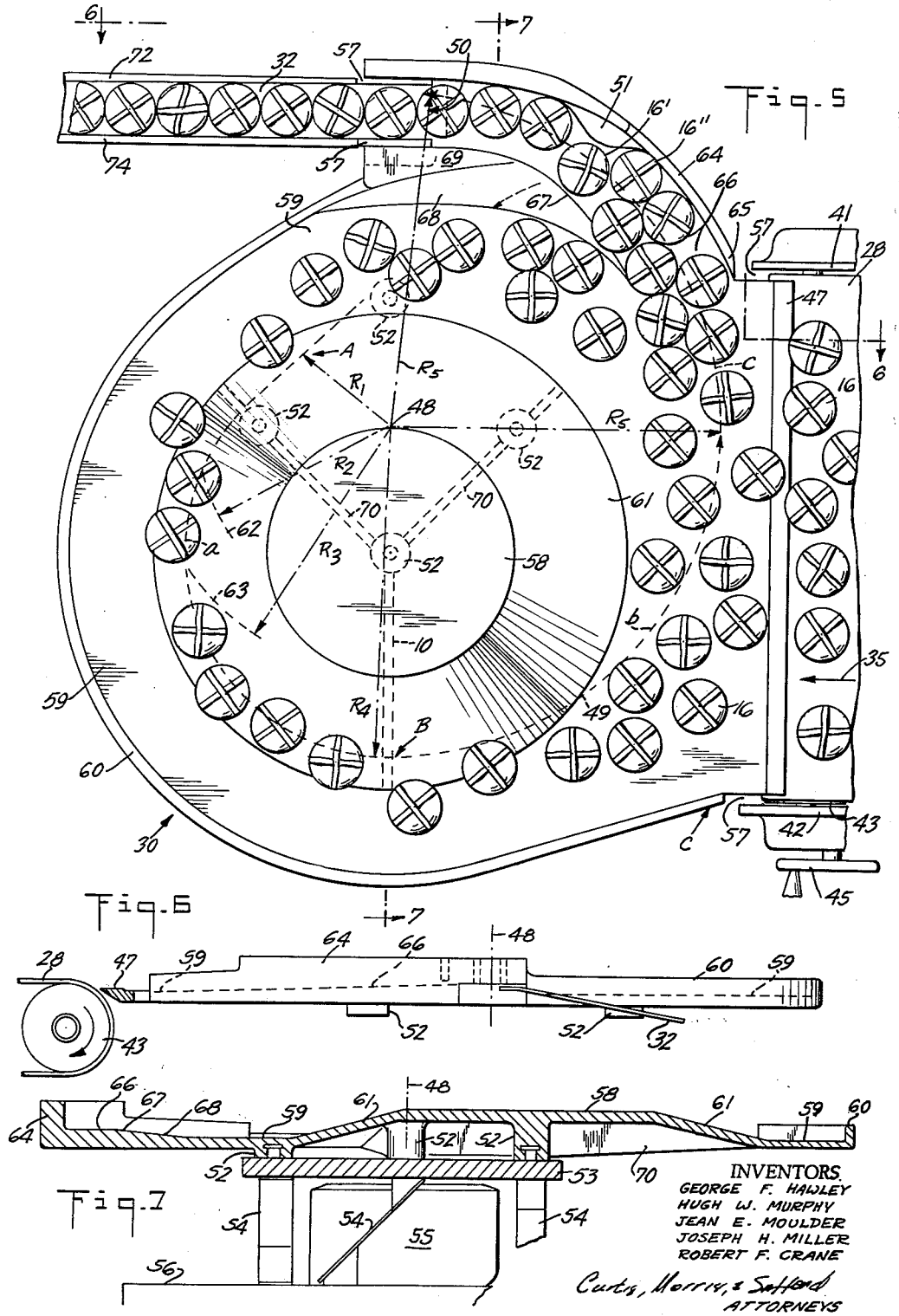

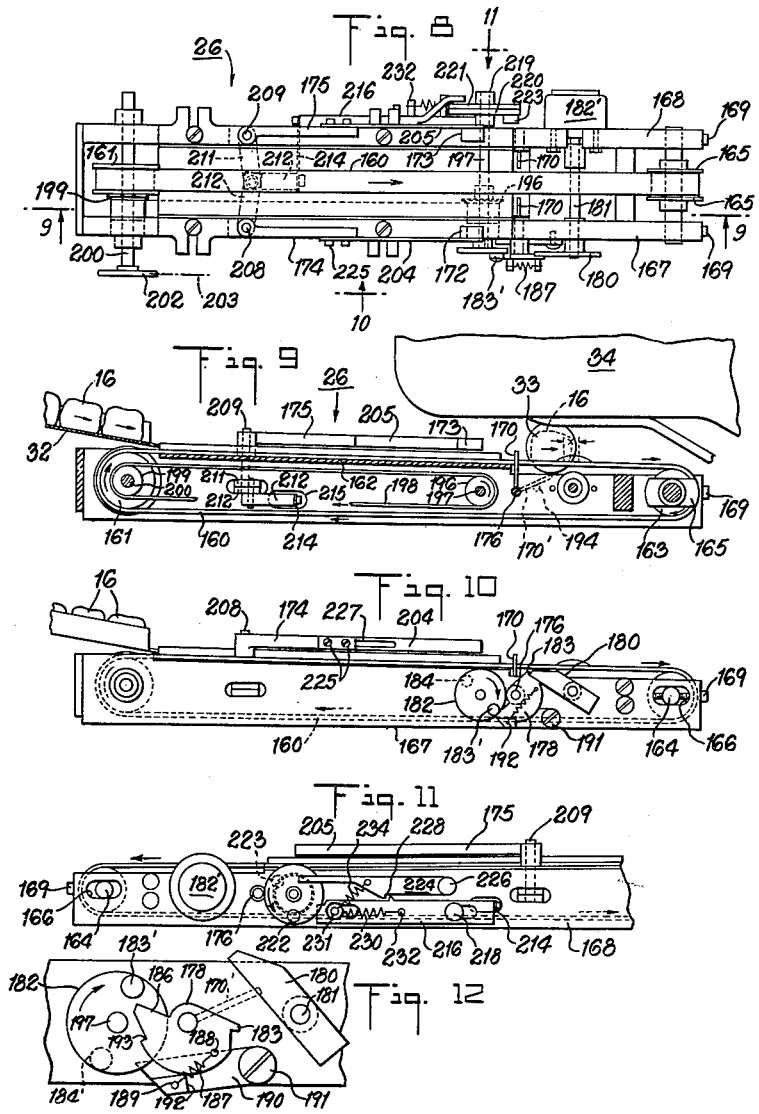

3,191,749
AUTOMATIC ALIGNMENT AND INPUT FEED-
ING MACHINERY FOR CONFECTIONARY
ARTICLES
George F. Hawley, Bogota, N.J., Hugh W. Murphy, Sara-
toga, Calif., Jean E. Moulder, Shelton, and Joseph H.
Miller, Old Greenwich, Conn., and Robert F. Crane,
Scarsdale, N.Y., assignors to AEL-Food Machinery
Division, Inc., Stamford, Conn., a corporation of
Connecticut
Filed Jan. 10, 1963, Ser. No. 250,661
17 Claims. (Cl. 198—30)

This is a continuation-in-part of Serial No. 38,543 filed on June 24, 1960.

This invention relates to automatic systems for handling large masses of confectionary articles and in particular to automatic input feeding machinery for lining up and feeding the confectionary articles into apparatus for further operations to be performed upon them. The automatic input machinery described herein as illustrative of the invention is particularly adapted for receiving a large group or bulk of freshly made confections and for gently sorting out this large mass of the confections and for feeding them along a line into positions and at a proper supply rate for further operations on the confections, while avoiding any damage or marring of the freshly made product.

In the manufacture of varous types of confectionary articles, there are stages in the manufacturing sequence wherein the freshly made confections are required to be fed along a predetermined path in a line at a proper feed rate into processing apparatus for further operations to take place on them. For example, these further operations include such treatments as individual wrapping of the confectionary articles in paper, plastic, or foil wrappers, and treatments such as enclosing the confectionary articles in other confections or in attractive coating of edible material, and often these further operations include packaging of the articles for protection and delivery and final sale to customers. The confectionary articles which require such operations during their manufacturing sequence includes such as chocolates, bonbons, sweetmeats, candies, cordial cherries, fruit candies, and the like.

These confectionary articles have the characteristics that they are delicate, they vary in size, shape and weight even though they are all of the same type and have been produced by identical sequences of steps. Moreover, as these delicate articles are discharged from the preliminary manufacturing operation they are often in a large group or bulk. These confections are suitably delivered from the previous manufacturing step, for example, as by delivery on layer cards in a storage box brought from storage, as by delivery from a cooling belt progressing out of a cooling tunnel, and similar means of delivery of large groups of confections. For the purpose of performing such further operations on them as discussed above, the individual articles in this large mass of confections must be properly arranged and individually fed into the subsequent processing apparatus.

This conversion of a large batch or mass of delicate confectionary articles into a single-file line of the confections at a proper feed rate for introduction into subsequent apparatus is very difficulty to accomplish rapidly at a large output rate commercially without marring the confections. In most instances prior to the present invention such delicate confectionary articles have been manually inserted one at a time into the processing equipment. The operator individually picked up the confection by hand from among a large batch of freshly made ones and then inserted it into the processing equipment in the desired position, laboriously repeating these operations many times each minute. This was expensive and wasteful of human talents. The present invention enables this in-feeding of the confectionary articles to be accomplished automatically, at a fast rate, in a dependable manner for continuous running hour-after-hour while protecting each confection from marring. Advantageously, this input feeding machinery compensates for the statistical variations in the rate at which the individual confections are supplied thereto, thus assuring a dependably continuous in-feed of confections to the further processing equipment.

In the prior copending application Serial No. 38,543, filed on June 24, 1960, is disclosed and claimed in automatic packaging system, machinery, and apparatus for handling confectionary articles including input feeding machinery. The present application discloses automatic alignment and input feeding machinery providing a greater flexibility and universality in handling various shapes and sizes of confectionary articles, and in arranging them single file and for feeding them along a line at a rate and into positions proper for introduction into the processing equipment.

Among the many advantages of the present invention are those resulting from the fact that it enables the automatic conversion of a large bulk or batch of confectionary articles into a single line with each article being fed along the line at a desired rate and enables this to be done rapidly and dependably without marring, disfiguring or crushing the delicate articles. Moreover, the automatic machinery described herein as illustrative of the present invention is capable of handling a variety of different shapes and sizes of confectionary articles.

A further advantage is that the individual confections are always maintained right side up, that is, they are not subjected to tumbling or rolling. Also, during the automatic sorting out of the confections, almost all of the guiding and propelling forces are exerted by the automatic machinery on the bottom of the individual confections while avoiding forceful pressures or jamming of the individual confections against each other. Thus, side or top contacts are minimized so as to preserve their freshly made attractive appearances.

In this specification and in the accompanying drawings are described and shown an illustrative embodiment of the automatic confectionary alignment and input feeding machinery of this invention, and various modifications thereof are indicated, but it is to be understood that these are not to be construed as exhaustive nor limiting of the invention, but on the contrary are given for purposes of illustration in order that others skilled in the art may fully understand the invention and the many ways of applying this invention in practical use.

The various objects, aspects, and advantages of the present invention will be more fully understood from a consideration of the following specification in conjunction with the accompanying drawings, in which:

FIGURE 1 is a plan view of an automatic system for packaging confectionary articles including the alignment and input feeding machinery of the present invention for receiving a large bulk of confections and feeding them along a line for further processing;

FIGURE 2 is a side elevational view of one of the individual machines in the system of FIGURE 1, shown on enlarged scale, and seen in association with a main box conveyor which is illustrated in end elevation;

FIGURE 3 is a side elevational view of a portion of one of the individual machines of FIGURE 1, for example, being a view taken along the line 3—3 of FIGURE 1 and showing in further enlarged scale. The portion of the machine shown in FIGURE 3 is seen in FIGURE 2 and includes apparatus utilized in the further processing of the confections;

FIGURE 4 is a perspective view of the automatic input feeding machinery shown in FIGURE 1;

FIGURE 5 is a plan view of a rotary vibratory platform conveyor forming a portion of the automatic input machinery;

FIGURE 6 is a side edge and partial sectional view of the rotary vibratory platform conveyor of FIGURE 5 as seen along the line 6—6 of FIGURE 5;

FIGURE 7 is a sectional view of the platform taken along the line 7—7 of FIGURE 5;

FIGURE 8 is a plan view of the in-feed escapement mechanism for feeding the articles one at a time in synchronized relationship with the continuous operation of the remainder of the system, the articles being released and fed into a launching station from which they can be picked up for further operations to be performed on them, for example to be put into individual wrappers;

FIGURE 9 is an elevational sectional view taken longitudinally through the in-feed escapement mechanism of FIGURE 8 along line 9—9;

FIGURE 10 is a right side elevational view of the escapement mechanism of FIGURE 8, as seen in the direction of the arrow 10;

FIGURE 11 is a left side elevational view of the escapement mechanism of FIGURE 8, as seen in the direction of the arrow 11; and FIGURE 12 is a view on enlarged scale, showing the operation of the in-feed release gate mechanism.

GENERAL DESCRIPTION AND OPERATION

In the packaging system shown in FIGURE 1 as an illustrative application utilizing the automatic alignment and input feeding machinery embodying the present invention, a main conveyor generally indicated at 2 progresses continuously in the direction of the arrow and carries suitable containers 4, such as boxes, for the confections being packaged. In this example of the invention the confections being handled are chocolate candies being packaged to form an assortment in the box. This conveyor comprises a pair of endless chains 5 and 6 (please see FIGURE 2) having brackets 8 mounted thereon at uniformly spaced points and adapted to support and move respective ones of the individual boxes 4. The conveyor chains 5 and 6 and the brackets 8 are each supported and guided along by means of upper and lower guide rails 12 and 13 (FIGURE 2), and the conveyor 2 is suitably driven at a fixed speed. The confections 16 are processed by being individually wrapped in wrappers 18 and then are placed into the boxes 4.

In order to place the confections 16 in their wrappers 18, and then to load the wrapped confections down into the boxes 4 in the desired respective positions therein, there are provided a plurality of packaging machines 20. In various systems these machines may be located on either or both sides of the main conveyor 2 depending upon the desired arrangement of the assortment being packaged. Each of these machines 20 may be considered to be in the nature of a satellite of the main conveyor, for each machine operates in timed relationship with the movement of the boxes 4 as they are carried along by the main conveyor. Each machine 20 is adjusted as desired to handle a confectionary article of a particular size and shape. In this example, the wrappers for the confectionary articles 16 are shown as being the familiar cup-type wrappers 18, and after being wrapped each chocolate is accurately inserted down into the box 4 in a precisely determined and carefully controlled position, while the box is being moved along by the main conveyor. For a detailed description of a whole packaging machine 20, reference may be made to said prior copending application Serial No. 38,543.

At the left end of the portion of the machine 20 which is shown in FIGURES 2 and 3 is located the wrapper supplying and positioning apparatus, generally indicated at 22. This apparatus 22 is shown as being adapted for handling wrappers in the form of fluted paper cups 18 and for positioning the cups at spaced intervals along a continuously moving conveyor, generally indicated at 24. As the empty wrappers 18 move along on the conveyor 24 toward the right they pass beneath an in-feed escapement and launching mechanism 26 (FIGURES 2 and 3) for supplying the confectionary articles to be wrapped.

After the manufacture of the confections 16 they are suitably delivered in a large group 25 including numerous individual delicate confections, often one hundred or more in each group, randomly oriented; for example, these confections are delivered on layer cards carried in a storage box, and, in some installations these confections are delivered by raking them off from a cooling belt progressing out of a cooling tunnel, and the like. Automatic alignment and input feeding machinery 27 embodying the present invention receives these large groups 25 of the confections 16 and automatically arranges them into a single-file delivery line for further processing. This sorting out and arranging of the individual confections is carried out dependably and at a rapid delivery rate without disturbing or damaging their freshly made appearance. Then, the automatic in-feed machinery 27 feeds these aligned confections long a downwardly inclined narrow ramp 32 into the in-feed escapement mechanism 26. This automatic input feeding machinery 27 includes a wide belt conveyor 28 and a rotary vibratory platform conveyor having a contoured configuration as described further below.

The rotary vibratory conveyor 30 holds a relatively large reserve of the articles and continuously circulates the articles in the direction of the arrow 31. In this illustrative example of the invention which is shown in the drawings, the operator manually loads the wide belt conveyor 28 from a tray of confectionary articles simply by sliding the articles off from the tray onto the conveyor, and then the articles move in a group from the conveyor 28 onto the vibratory platform 30. However, it will be understood that any suitable delivery arrangement can be utilized as indicated above, for example, in a chocolate packaging operation, the operator conveniently brings the freshly made chocolates from the manufacturing stage on the tray-like layer cards in storage boxes customarily used for carrying the candies and slides the chocolates from the layer cards onto the belt 28.

It is to be noted that the confections in the batch 25 on the belt conveyor 28 are randomly positioned. Consequently, there are statistical variations in the numbers of confections per unit time which are transferred by the belt conveyor 28 onto the rotary conveyor 30. The conveyor 28 provides a reserve supply of the confections, and the action of the rotary vibratory conveyor 30 is to compensate for this statistical variation in the rate, i.e. numbers of confections per unit time, at which the confections are supplied thereto.

If the rotary vibratory platform conveyor is full, then the additional articles remain on the belt conveyor 28. As the articles circulate on the rotary vibratory platform conveyor 30 in the direction of the arrow 31 they are directed toward the ramp 32 so as to slide down the ramp in single file into the rear end of the in-feed escapement and launching mechanism 26.

At timed intervals the confections move to the launching station X in the mechanism 26. From this launching station the articles are picked up by means of a pair of opposed spoon-like grasping members 33 (FIGURE 3) which project down and move along beneath a wrapper loading assembly 34. This wrapper loading assembly 34 is here illustrated by way of example as being adapted gently to pick up soft chocolate candies one at a time from the station X and then advantageously to place them down into the wrapper cups 18 while the cups move continuously along with the cup conveyor 24. The wrapped articles, such as the cupped chocolates being shown, continue moving along on the cup conveyor 24 and are discharged at the right onto a smoothly polished dead plate 36 (FIGURE 3) which is flush with the surface of the cup conveyor.

From this dead plate 36 the wrapped articles are automatically loaded into the boxes by the box-loading machinery 37 shown in FIGURE 2. As shown in FIGURE 2 thus box-loading machinery includes a plurality of inserter mechanisms 40 which sequentially move down into the respective boxes for loading the wrapped confections therein.

DETAILED DESCRIPTION AND OPERATION

During operation of the automatic input feeding machinery 27, the batches 25 of the confections are supplied from the manufacturing stage onto the belt conveyor 28, which moves the confections 22 toward the rotary vibratory platform conveyor 30, as indicated by the arrow 35. The conveyor belt 28 is formed of wide flexible material having a smooth top surface for preventing any marring of the bottom surfaces of the confections resting thereon. In this example the conveyor belt 28 is fourteen inches wide and is formed of fabric having a smooth outer coating of slippery plastic material.

The upper surface of the belt 28 moves between a pair of smooth parallel guide rails 41 and 42 and the belt passes around a pair of spaced parallel rollers 43 and 44 mounted on the housing 46. This belt is driven at an adjustable speed by means of a suitable variable-speed primary drive mechanism. A conveyor-speed adjustment control 45 is used for controlling the drive mechanism for adjusting the linear feed rate of the belt 28 over a suitable ranged. There is a fast-feed position for the control 45, for rapidly transferring numerous confections from the belt 28 onto the vibratory platform 30 when desired by the operator.

In order to convert this larger bulk of randomly oriented confections into a single-file line progressing along for further processing, these confections are acted upon by the rotary vibratory platform conveyor 30. The transfer from the belt 28 onto the smooth top surface of the vibratory conveyor occurs adjacent to the roller 43. There is a straight lip 47 extending along one edge of the vibratory conveyor which is chamfered along its underside and is positioned near to the curving surface of the belt just slightly below the level of the upper flight of the belt 28.

In order to assure transfer of the confections onto the vibratory platform 30 without marring, the top surface of this lip 47 is smooth and is precisely aligned with the axis of the roller 43 so as to be spaced at all points below the plate of the upper surface of the conveyor 28 by a slight amount of the order of 1/16 of an inch.

The vibratory platform conveyor 30 oscillates with small, rapid, rotary reciprocating movements about a vertical neutral axis 48. This neutral axis is offset from the central area of the platform 30 and the smooth surface of this platform is contoured so as to guide each confection in turn along a path 49 approaching an outlet 50 near the top end of the ramp 32. defining the in-feed line. If it happens that this in-feed line 32 becomes full of confections, then a line-breaking cam 51 deflects the next confection 16' to one side and causes it to recirculate once more along the path 49.

Thus, advantageously, after each confection has been transferred from the conveyor 28 into the platform 30 it is quickly guided into the line 32. The confection tends to go directly into the outlet 50 or to be circulated one revolution and then directly into the outlet 50. The platform 30 converts the statistically random variations in arrival of the confections thereon into a uniform rate of in-feed along the line 32 which is matched to the required rate of supply fror processing in the subsequent equipment.

The oscillatory movement of the platform 30 combines vertical and horizontal components of motion. During the advancing rotary movements, i.e., counterclockwise movement in this example as seen in plan view in FIGURE 5, the platform moves upwardly, i.e., is rapidly elevated, by a slight amount. Consequently, the confections are firmly engaged by the smooth surface of the platform and are urged to move with it because their inertia causes them to tend to press down upon the platform as they resist its rapid upward movement. Thus, the confections are all advanced an incremental amount in the direction 49. During the returning, i.e., retrograde, clockwise movement of the platform 30 as seen in FIGURE 5 it is quickly lowered by a corresponding slight amount, thus reducing the frictional force between the confections and the platform so that they retain a large proportion of their incremental advancement until the next advancing movement of the platform begins.

In order to produce this combined vertical and rotary movement, the platform 30 is suitably mounted and driven. For example, the platform has four mounting lugs 52 which are rigidly attached to a ferromagnetic plate 53 which is supported upon a plurality of leaf springs 54 each canted at the same acute angle to the vertical, so that deflection of the springs causes the platform 30 to turn slightly as it is moved vertically. An electromagnet 55 rests upon the base 56 and cyclically attracts the plate 53 to produce the desired deflection of the springs 54.

For example, this platform has been found to operate extremely well when the electromagnet 55 is energized by means of unfiltered, half-wave-rectified alternating current of a frequency of 50 or 60 cycles per second, thus producing 50 or 60 rotary strokes, i.e., incremental advancing movements per second. To produce the desired motion of the platform 30 with the least amount of driving power, the platform 30 is arranged to have an angular moment of inertia about its axis 48 resonant with the effective torsion of the combined action of the springs 54 acting about this same axis. The platform 30 is formed of aluminum and its upper surface is smoothly polished.

To accommodate this rotary vibratory movement of the platform 30, there are clearance gaps 57, as seen in FIGURE 5, between the opposite ends of the lip 47 and the guide walls 41 and 42 and between the lip and belt 28. Similar clearance gaps are provided between the upper end of the ramp 32 and the adjacent parts of the platform 30.

In operation this vibratory platform 30 tends to propel each confection along a natural path over its horizontal area, and this natural path for each confection is generally a path progressing about the center 48. In order to guide the confections outwardly from their natural path as they travel from the region A to the region B, the center portion 58 of the platform is raised approximately 3/4 of an inch above the horizontal annular surface 59 adjacent to a perimeter wall 60. This raised center portion has a diameter of approximately seven inches, and is surrounded by a truncated conical surface 61 with an outer diameter of approximately thirteen inches. Consequently, this sloping conical surface acts as an outwardly directed spiral guide about the oscillatory axis 48.

In the region A the distance from the axis 48 to a point halfway up the slope 61 is approximatley 1½ inches, and in the region B this distance is approximately 7½ inches, causing the confections to spiral outwardly along the path 49. It will be noted that beginning at a point near the region A and continuing over to the point C the perimeter wall 60 progresses outwardly away from the oscillatory center 48. Thus, advantageously, the confections rarely come into contact with this wall 60 and are not marred by it. As the confections travel along on the horizontal surface 59, they tend to progress along curves wherein the radii from the vibratory axis 48 do not change very fast, that is, circular curves or outward spirals which have a small pitch. Thus, as the confections move along the first portion of path 49 from the region A to the region B they tend, more or less, to move along curves such as 62 or 63 at approximately fixed radial distances $R_2$ and $R_3$ from the vibratory center 48, but the sloping surface 61 forces them to follow the outwardly progressing portion "a" of path 49.

After the confections have passed the region B, they progress along the second portion "b" of path 49 wherein they remain at generally constant radial distances from the axis 48 and so they are now in a proper relationship to move into the outlet 50 without requiring any extensive amount of side guidance. Their sides and top surfaces remain fresh in appearance.

There is a converging outer guide wall 64 which begins at a point 65 adjacent to the clearance gap 57 and continues over to the outlet 50. This wall curves inwardly with respect to a fixed radius $R_5$ swung in an arc "c" about the vibratory axis 48, and thus the confections approach this wall 64 and are guided by it toward the outlet 50.

Commencing near the point 65 in front of the outlet 50 there is an upwardly sloping ramp 66 which approaches this outlet. This ramp 66 extends for a substantial angular distance about the vibratory axis 48, as shown. It is noted that FIGURE 5 is drawn accurately to scale one-third actual size, so that dimensions and angular relationships can be scaled from this drawing. This ramp 66 rises to an elevation ¼ of an inch above the horizontal surface 59. Sloping downwardly and inwardly from the edge 67 of this ramp to the horizontal surface 59 is a deflection surface 68 which aids the line-breaking cam 51 in rejecting the excess confections, when the line 32 is full. The following confection 16" cooperates with the cam 51 to push and wedge the confections 16' over laterally toward the edge 67. As soon as this rejected confection 16' reaches the edge 67, it slides down the deflection surface 68 so as to reenter the path 49 for making another trip around the platform 30. The end 69 of the wall 60 is wedge-shaped adjacent to the deflection surface 68, so as to be available to help in rejecting the excess confection 16'.

In summary, the vibratory platform 30 accommodates the statistical variations in density of arrival of the confections thereon. Each confection which arrives thereon is caused to move toward the outlet 50. Many of them pass through the outlet 50 on this first attempt. In the event the confection does not happen to enter the outlet 50, it is caused to follow the circulation path 49. At the region A the confection is at a small radius $R_1$ from the vibratory center 48. The sloping surface 61 comprises guide means which progressively guides and forces the confections out to the region B at a much larger radius $R_4$ from the vibratory center 48. When the confections reach the region B they are at a proper radial distance $R_4$ from the vibratory center 48 so as to follow a natural curve portion "b" of the path 49 so as to pass through the outlet 50, without requiring any further extensive side guidance.

As a result of this advantageous operation of the rotary vibratory platform 30, very few of the confections remain thereon for more than one-and-quarter revolution. Many of them only remain thereon for a quarter of a revolution. In the event that an unduly large group of confections arrive upon the platform 30, then the slope 61 and the central hump 58 serve as a temporarp storage reservoir. The confections can temporarily move up the slope 61 and onto the hump 58 under such temporarily overloaded conditions. The raised central portion 58 has reinforcing ribs 70 beneath it.

As described previously, the confections move in a line down the ramp 32 between channel walls 72 and 74 and file into the in-feed escapement mechanism 26. At the foot of the ramp, the confectionary articles 16 file onto a continuously moving narrow launcher belt 160.

Preferably the outer surface of this belt 160 is coated with a smooth flexible durable material having a low coefficient of sliding friction, for example, a slippery plastic, such as a "Teflon" polytetrafluorethylene coating, because the launcher belt must be sanitary, and it must slide easily beneath the confections when desired. This narrow belt 160 is driven by a flanged pulley 161 and slides over a support pad 162. At the launching end of the assembly 26, the belt passes over a freely turning roller 163 mounted on a stationary adjustable shaft 164 between a pair of guides 165 which are fixed to the shaft. For adjusting belt tension, the ends of the shaft 164 can be moved along a pair of slots 166 in the respective side plates 167 and 168 by means of adjusting screws 169.

The continuous motion of the belt brings the file of confections forward until the leading one bumps up against a release gate 170 of an in-feed escapement mechanism also including a pair of holding pads 172 and 173 which are mounted on the ends of a pair of retaining fingers 174 and 175. These pads 172 and 173 close gently against opposite sides of the second confection in the file while the first one is released by the gate 170, and then the second one is released by the pads and the file moves up against the gate again, and so forth.

In order to control the gate 170 so as to move it down to its retracted position 170', it is fixed on a rotatable shaft 176 having a spring-biased control cam on one end, as shown in FIGURES 10 and 12 at 178. A normally-disengaged latch detent 180 on a shaft 181 is controlled by a rotary solenoid 182', and upon energization of this solenoid the detent 180 swings down behind a lip 183 as shown in FIGURE 10 to hold the gate upright. Normally this detent 180 remains out of operation, as shown in FIGURE 12. The purpose of this detent 180 is to enable the operator to restrain the confections in the respective machines 20 while the main conveyor is being started up in the morning. Then the successive detents 180 of the various machines 20 are disengaged in sequence as the leading box 4 progresses along the main conveyor from machine to machine, thus releasing the successive lines of confections in proper timed relationship to begin being wrapped and loaded into the respective boxes. It is to be noted that the gate 170 is in two parts, as illustrated in FIGURE 8, and these straddle the narrow belt 160.

When the detent 180 has been disengaged, then the movement of the control cam 178 is regulated solely by rotation of a cam wheel 182 having outer and inner projecting roller lugs 183' and 184, respectively. Upon each rotation, the outer lug 183' engages the flat cam surface 186 of the control cam 178 and pushes it downwardly as shown in FIGURE 10. In this way the gate 170 is raised, against the action of a tension spring 187 which extends between a mounting pin 188 on the control 178 and another mounting pin 189 on a pivoted latch detent lever 190 having a pivot screw 191. As soon as the gate is fully upright, the spring 187 pulls the detent lever upwardly, as shown in FIGURE 10. A small block 192, which is secured to the lever 190, engages up into a notch 193 so as to hold the gate upright against the action of the spring 187. As the wheel 182 continues to rotate, the inner lug 184 subsequently strikes the tip end of the detent lever 190 to depress it. This moves the small block 192 down out of the notch 193, releasing the gate, and immediately the spring 187 snaps the gate 170 down to its open position 170' against a stop pin 194 (please see FIGURE 9). As the gate snaps down, the leading confection is released and moves along with the narrow launcher belt 160 until its center of gravity reaches the precisely predetermined launching station within the narrow range X.

For driving the cam wheel 182, a ribbed timing belt sprocket pulley 196 is secured to the shaft 197 of the wheel 182, and a timing belt 198 extends between this ribbed pulley 196 and a ribbed driving sprocket pulley 199 on a shaft 200 in common with the pulley 161. The power input for operating the mechanism 26 is fed in by means of the shaft 200. To maintain proper timed relationship, there is a positive driving relationship between the motion of the wrapper conveyor 24 and the shaft 200. This positive drive is provided by a sprocket 202 connected by a chain 203 to a corresponding sprocket as shown in FIGURE 2, which is suitably driven by means of a main drive motor 207.

In order to hold back the other confections when the first one is released by the lowering of the gate 170, the two opposed soft pads 172 and 173 are gently pressed against opposite sides of the second one. As seen in FIGURE 8, these pads are carried on the free ends of small easily adjusted extension elements 204 and 205 attached to the ends of the swinging fingers 174 and 175, respectively. A resilient drive member 214, shown as a leaf spring, serves to limit the force applied to the sides of the confections. It will be appreciated that there is a random variation in size and shape between confections of the same kind, and the resilience of the springs 204 and 205 protects the larger ones against the possibility of crushing between the pads 172 and 173.

The swinging fingers 174 and 175 are operated by vertical shafts 208 and 209 having actuator levers 211 and 212 secured to their lower ends. These actuator levers are each pivotally connected to a longitudinally reciprocating pusher block 212 which is driven by the leaf spring 214 projecting laterally out through a slot 215 in the side plate 168. This spring 214 also protects the chocolates, as discussed above. It is connected to the end of a reciprocating slide 216, which is held in place by a headed pin 218 engaging a slot in the slide 216, as seen in FIGURE 11.

To drive this slide 216 back and forth and to enable adjustment of the cycle of operation of the holding pads 172 and 173 with respect to the periodic opening and closing of the gate 170, there are provided a rotating pusher cam wheel 220 secured to the shaft 197 and a ring gear 221 which engages this wheel. By manually removing a retaining coller 219 (please see FIGURE 8) and disengaging the ring gear 221 from the wheel 220, then the operator can rotate the ring gear 221 with respect to the wheel 220 to adjust the angular position of an outer trigger lug 222 mounted on the ring gear 221 with respect to an inner pusher cam 223 fixed to the inner surface of the wheel 220. This adjustment accommodates different sizes of confections. Those confections which have a longer length are positioned farther from the gate 170 when they are released by the pads 172 and 173, because of the corresponding longer length of the first one which was behind the gate. Accordingly, the holding pads 172 and 173 should be released sooner after the gate 170 springs open to provide more time for a longer confection to advance up to the gate 170. In fact, the longer ones may be released by the pads while the gate is still open. Then the gate closes just before the advancing file reaches it. Thus, advantageously, the speed of the belt 160 does not require changing to handle different sizes of confections. Instead, the cyclic timing is conveniently changed. Shorter confections have less distance to travel and are released later in each cycle to prevent their reaching the gate before it has closed. Also, the effective lengths of the swinging elements 204 and 205 are adjusted for various sizes of confections by loosening the pairs of screws 225 (FIGURE 10) which pass through slots 227 therein.

In operation, the trigger lug 222 periodically raises the end of a trip lever 224 pivotally mounted on a shoulder screw 226 so as to release the interengaged detents 228. When the slide 216 is released, a tension slide spring 230 connected between a fixed stud 231 and a pin 232 on the slide pulls the slide toward the left in FIGURE 11, causing the holding pads 172 and 173 to swing apart to release the line of chocolates and allow them to move up against the gate 170. The pusher cam 223 strikes the end of the reciprocating slide 216 and pushes it back, closing the pads 172 and 173 upon the second chocolate in the file, and allowing a lever spring 234 to re-engage the detents 228, in readiness for the next cycle.

As shown in FIGURE 9, the article 16 which was released by the gate 170 moves forward on the narrow launcher belt 160, and as it does so, a pair of spoon-like grasping members 33 move along on opposite sides of the launcher belt with their concave surfaces adjacent to opposite sides of the article 16. The speed of these members 33 is synchronized with the movement of the article 16. When the center of gravity of the article is within the narrow range X, which is called the launching station, then the bowls of the members close gently against the article and lift it away from the launcher belt as the belt curves down around the roller 163.

Now the advantageous operation of the in-feed escapement mechanism 26 will be more fully appreciated, because it enables adjustment for handling a wide range of sizes of articles without changing the speed of the launcher belt. Thus, the synchronism between the launcher belt and the grasping members 33 is always maintained regardless of the particular size of article being handled. Moreover, the continuously moving in-feed belt 160 serves to average out any few remaining statistical variations in the supply of confections which may not have been averaged out by the vibratory platform 130. Occasionally there are gaps occurring in the file of confections moving along the line 32. Any such gaps are closed up by the belt 160. The lead confections in the line are restrained by the gate 170, and as the belt 160 continues sliding beneath them it brings succeeding confections up against them so as to close up the gaps in the in-feed line.

It will be noted that the line-breaking cam 51 automatically serves to limit the cumulative effective length of the line 32. Thus, it limits the total force exerted by the confections adjacent to the gate 170, thus advantageously protecting the leading confection from damage.

As used herein the terms "confectionary articles," "confections," and the like are intended to include chocolates, bonbons, sweetmeats, candies, cordial cherries, fruit candies, covered candies, and the like.

From the foregoing it will be appreciated that the automatic alignment and input feeding machinery of the present invention for supplying confectionary articles dependably and rapidly in a line for further processing is well suited to provide the advantages set forth, and since many possible embodiments may be made of the various features of this invention and as the apparatus described herein may be varied in various parts, all without departing from the scope of the invention, it is to be understood that all matter hereinbefore set forth or shown in the accompanying drawings is to be interpreted as illustrative and that in certain instances some of the features of the invention may be used without a corresponding use of other features, all without departing from the scope of the invention as claimed hereinafter.

We claim:

1. In a system for processing confectionary articles, automatic feed mechanism for receiving a large mass of randomly positioned freshly made confections from a previous manufacuring stage and for arranging said confections into a line continuously fed to a subsequent stage in said system comprising conveyor means for receiving a large group of confections thereon randomly arranged, a vibratory platform adjacent to said conveyor means for receiving the confections from said conveyor means, drive means for oscillating said platform with short rotary vibratory reciprocation about a vertical axis, said platform having a generally horizontal surface encircling said axis, said rotary vibratory reciprocation serving to advance the confections along said horizontal surface in a predetermined direction about said axis, said platform having a raised inner area with a downwardly sloping surface extending outwardly and downwardly from said raised inner area to said horizontal surface, said sloping surface curving outwardly with respect to said vibratory axis for urging the confections outwardly as they advance about said axis while avoiding contact with the side surfaces of the confections, said vibratory platform having a generally tangential discharge outlet, said outlet progressing in said direction on one side of said axis, said discharge outlet having a configuration for receiving said confections after they have been guided outwardly by said sloping surface and for passing said confections individually therethrough, a continuously moving slippery conveyor belt for receiving the line of confections passed by said outlet, and controllable release means for restraining the leading confections on said slippery belt while said slipper belt slides beneath the leading confections, thereby closing up any gaps in said line.

2. Automatic input feeding apparatus for receiving a large group of freshly made confections randomly arranged and for gently rearranging this group of confections into a moving line for further operations to be performed on the confections comprising a rotary vibratory platform having an upper surface for supporting and moving the confections on said platform, said vibratory platform defining an opening for discharging the confections one-at-a-time from said platform, drive means for vibrating said platform about a vertical axis with short rotary vibratory strokes about said axis for advancing said confections along the surface of said platform in a direction about said axis, guide means progressing in said direction and diverging outwardly away from said axis on the opposite side from said opening for forcing the confections outwardly away from said axis, wall means adjacent to said discharge opening converging inwardly toward said opening in said direction for guiding the confections into said opening, and means for moving a line of confections away from said discharge opening after the confections have passed through said opening.

3. Automatic input feeding machinery for converting a large group of randomly arranged confections into a moving line comprising a wide conveyor belt for receiving a large group of confections thereon, a vibratory platform having an upper surface with one edge closely adjacent to said conveyor for receiving the confections delivered thereto by said conveyor, said vibratory platform having a central portion raised above the peripheral portion and a surface sloping downwardly from said central portion to said peripheral portion, rotary vibratory drive mechanism for vibrating said platform about an upright axis with short rotary strokes about said axis, said axis being eccentrically located with respect to said raised central portion of the platform with the major part of said raised central portion being eccentrically located off to one side of said axis, said platform having a discharge opening on the opposite side of said axis from the location of said raised central portion of the platform for discharging the confections one-at-a-time from said platform, and means for guiding a line of confections away from said discharge opening after they have passed through said discharge opening.

4. In a system for processing confectionary articles, automatic feed mechanism for receiving a large mass of randomly positioned confections from a previous manufacturing stage and for arranging said confections into a line continuously fed to a subsequent stage in said system comprising a vibratory platform, drive means for oscillating said platform with short rotary vibratory reciprocation about a vertical axis, said platform having a guide channel encircling said axis, said rotary vibratory reciprocation serving to advance the confections along the surface of said guide channel in a predetermined direction about said axis, said platform having a discharge outlet diverging outwardly away from said channel and progressing in said direction on one side of said axis, said discharge outlet having a configuration for passing said confections individually therethrough, and a guide surface sloping upwardly and inwardly from said channel, said guide surface being positioned mainly on the opposite side of said axis from said discharge outlet, said guide surface spiraling outwardly away from said axis on the opposite side of said axis from said discharge outlet, a continuously moving narrow conveyor belt for receiving the line of confections passed by said outlet, and controllable release gate means for restraining the leading confections on said narrow belt while said narrow belt slides beneath the leading confection for closing up any gaps in said line of confections.

5. Automatic input feeding machinery for receiving a large group of randomly arranged freshly made confections and for converting said group into a moving line for subsequent operations to be performed thereon comprising a wide conveyor belt for receiving a large group of confections, a vibratory platform having an upper surface with one edge closely adjacent to said conveyor for receiving the confections delivered thereto by said conveyor, said vibratory platform having a central portion raised above the peripheral portion and a surface sloping downwardly from said central portion to said peripheral portion for guiding the confections while avoiding contact with the sides of the confections, rotary vibratory drive mechanism for vibrating said platform about an upright axis with short rotary oscillatory strokes about said axis for advancing the confections along a path over said surface passing around said axis, said axis being eccentrically located with respect to said raised central portion of the platform with the major part of said raised central portion being eccentrically located off to one side of said axis, said platform having a tangentially arranged discharge opening on the opposite side of said axis from the location of said raised central portion of the platform, said opening facing in the direction of advancement of the confections along said path for discharging the confections one-at-a-time from said platform, curved guide means approaching the side of said opening remote from said axis, said curved guide means extending in said direction and curving inwardly toward said path as said curved guide means approaches said opening for guiding the confections into said opening, means for conducting a line of confections away from said discharge opening after they have passed through said discharge opening and control means for regulating the feeding of said line of confections into the subsequent operations.

6. Automatic input feeding machinery as claimed in claim 5 and wherein there is a line-breaking cam adjacent to the side of said opening remote from said axis, said line-breaking cam bulging inwardly toward said axis for buckling any long line of confections which may accumulate along said curved guide means for preventing the cumulative line-pressure of said of said line of confections from being applied to said control means, for effectively limiting the amount of cumulative line-pressure applied to said control means.

7. Automatic input feeding machinery for receiving a large group of randomly arranged confections and for converting said group into a moving line for subsequent operations to be performed thereon comprising a wide conveyor belt for receiving a large group of confections, a vibratory platform having an upper surface for receiving the confections delivered thereto by said conveyor, said vibratory platform having a central portion raised above the peripheral portion and a surface sloping downwardly from said central portion to said peripheral portion for guiding the confections while avoiding contact with the sides of the confections, rotary vibratory drive mechanism for vibrating said platform about an upright axis with short rotary oscillatory strokes about said axis for advancing the confections along a path over said surface passing around said axis, said axis being eccentrically located with respect to said raised central portion of the platform with the major part of said raised central portion being positioned off to one side of said axis, said platform having a tangentially arranged discharge outlet on the opposite side of said axis from the position of said raised central portion of the platform, said outlet facing in the direction of advancement of the confections along said path for discharging the confections one-at-a-time from said platform, curved guide means approaching the side of said outlet remote from said axis, said curved guide means extending in said direction and curving inwardly toward said path as said curved guide means approaches said outlet for guiding the confections thereinto, a curved ramp extending upwardly along adjacent to said curved guide means and commencing in front of said outlet and extending up to said outlet, a deflection slope extending down from the inner edge of said ramp for urging excess confections away from said outlet, means for conducting a line of confections away from said discharge opening after they have passed through said discharge opening and control means for regulating the feeding of said line of confections into the subsequent operations.

8. Automatic input feeding apparatus for confectionary articles for converting a large group of randomly arranged freshly made confections into a moving line of confections for subsequent processing comprising a generally circular vibratory platform having an upper surface, rotary vibratory drive mechanism for vibrating said platform about a vertical axis in a reciprocating vibratory movement centered at said axis for moving said confections along the surface of said platform in a direction encircling said axis, wall means for preventing the confections from falling off from said platform, said vibratory platform having a straight edge portion, a wide conveyor belt supported on a plurality of rollers for receiving the randomly arranged confections on said wide belt, said wide belt passing adjacent to said straight edge portion of the vibratory platform for transferring the confections onto said platform, said platform having a discharge outlet generally tangentially arranged with respect to said platform and facing in the direction of said movement of the confections along said surface, a curving ramp on said platform sloping upwardly to said outlet and curving in said direction of movement of the confections along said surface for the confections to travel up said ramp to said outlet, said platform having a deflection area sloping downwardly and inwardly from the edge of said ramp for diverting excess confections off from the edge of said ramp and down said deflection area away from said outlet, whereby the excess confections move in said direction encircling said axis and again approach said ramp, and means for removing a line of confections from said outlet after the confections pass through said outlet.

9. Automatic input feeding apparatus for confections as claimed in claim 8 and wherein said curving ramp begins at a point near one end of said straight edge portion of the vibratory platform.

10. Automatic input feeding apparatus for confections as claimed in claim 9 and wherein said straight edge portion of the vibratory platform is chamfered on its underside and said wide conveyor belt curves around a supporting roller closely adjacent to and partially beneath said chamfered edge portion of the platform, the top of said edge portion being slightly lower than the top surface of the wide conveyor belt.

11. Automatic input feeding apparatus for confectionary articles as claimed in claim 8 and wherein there is a line-breaking cam adjacent to said outlet for buckling any line of confections which may accumulate along said ramp for deflecting the excess confections over onto said deflection area.

12. Automatic input feeding apparatus for confectionary articles for converting a large group of randomly arranged freshly made confections into a moving line of confections for subsequent processing comprising a generally circular vibratory platform having an upper surface for supporting and moving the confections thereon, rotary vibratory drive mechanism for vibrating said platform about a vertical axis in a reciprocating vibratory movement centered at said axis for moving said confections along the surface of said platform in a direction encircling said axis, wall means for preventing the confections from falling off from said platform, said platform having a discharge outlet generally tangentially arranged with respect to said platform and facing in the direction of said movement of the confections along said surface, a curving ramp on said platform sloping upwardly to said outlet and curving in said direction of movement of the confections along said surface for the confections to travel up said ramp to said outlet, said platform having a deflection area sloping downwardly and inwardly from the edge of said ramp for diverting excess confections off from the edge of said ramp and down said deflection area away from said outlet, whereby the excess confections move around said axis and again approach said ramp, said vibratory platform having a raised circular area near the center thereof and a truncated conical surface sloping downwardly around said raised circular area, said raised circular area being eccentrically located with respect to said vibratory axis for guiding the excess confections outwardly away from said axis as they move around said axis for placing said excess confections in position to move up said ramp after they have circled around said axis, and means for removing a line of confections from said outlet after the confections pass through said outlet.

13. Automatic input feeding apparatus for confectionary articles as claimed in claim 12 including a wide conveyor belt for receiving the randomly oriented confections, said vibratory platform having a lip adjacent to said conveyor belt for the confections to be transferred thereto from said belt, said vibratory platform and said belt having a small clearance space therebetween for accommodating the vibratory movement of said platform.

14. Automatic input feeding apparatus for confectionary articles for receiving the articles right side up and randomly arranged and for rearranging the articles into a line of articles in preparation for further handling of the articles comprising a rotary vibratory conveyor platform having a discharge outlet for passing the articles therethrough one at a time to form a line of the articles, rotary vibratory drive means for oscillating said platform about a generally vertical axis with short reciprocation strokes about said axis, first guide means for guiding the articles outwardly along a curved path on said platform progressing from a first position of lesser radius from the vibrating axis to a second position of greater radius from said axis, said vibratory platform having a supply area over which said articles travel freely after they have progressed out to said second position, guide wall means on the opposite side of said supply area and approaching said outlet for guiding the articles into said outlet, said vibratory platform having a surface sloping inwardly and downwardly from said outlet for urging any confectionary articles which have not entered said outlet to move inwardly and around toward said first position in preparation for re-engagement with said first guide means for recirculation around said platform so as to make a subsequent approach to said outlet, and conveyor means adjacent to said supply area for feeding confectionary articles to said supply area of the vibratory platform, whereby said confectionary articles are maintained right side up and are gently guided toward said outlet and many of the articles from said conveyor means progress out of said outlet without travelling one full revolution on said platform, thereby protecting the bottom surfaces of the articles from undue wearing action.

15. Automatic input feeding machinery for delicate chocolate confections and the like for converting a large group of confections which are right side up but randomly positioned into a single file line of the confections adjacent one another for feeding into apparatus comprising a wide conveyor for receiving large groups of the confections loaded thereon right side up but randomly positioned, a pair of spaced guides extending along opposite sides of said wide conveyor, drive mechanism for advancing the confections along said wide conveyor between said guides, a generally circular vibratory platform conveyor having one edge closely adjacent to the end of said wide conveyor between the end of said guides for receiving the confections delivered thereto by said conveyor, rotary vibratory drive mechanism for vibrating said platform about an upright axis with small, rapid, rotary oscillatory movements for advancing each confection on said platform along a path curved about said axis, said vibratory platform having a discharge outlet from its peripheral portion for discharging the confections one-at-a-time from said platform, a central portion raised above the peripheral portion and a surface sloping downwardly from said central portion to said peripheral portion for influencing the direction of advancement of each individual confection outwardly toward said outlet while avoiding contact with the side or top surfaces of the confections, and narrow conveyor means having closely spaced parallel walls for receiving therebetween a single file line of confections for conveying said single file line of the confections away after they have passed through said discharge outlet.

16. Apparatus for automatically supplying confections one at a time from a group of confections comprising a wide belt conveyor for receiving a group of confections thereon, a rotary vibratory platform conveyor adjacent to the end of said belt conveyor for receiving the confections therefrom, said vibratory platform and the end of said conveyor having a generally coplanar relationship, said vibratory platform having a generally circular configuration with a peripheral discharge therefrom for passing the confections single file from said vibratory platform, a second conveyor belt for receiving the confections thereon single file after discharge from said vibratory platform, drive means for continuously moving said second conveyor belt, said second conveyor belt having a smooth flexible coating material for providing a low coefficient of sliding fraction beneath the confections thereon, barrier means for stopping the leading confection on said second belt as said second belt continues to move forward beneath the confection and means for cyclically removing the leading confection and each succeeding confection after engagement with said barrier means for supplying the confections one at a time.

17. Apparatus for automatically supplying confections in single file from a group of confections comprising a rotary vibratory conveyor having a generally circular configuration for circulating the confections thereon, said rotary vibratory conveyor having an outlet near its perimeter and facing in the direction of circulation of said confections for passing the confections single file from said vibratory conveyor, a wide linear conveyor for receiving a group of the confections thereon, said wide conveyor having one end adjacent to said rotary vibratory conveyor in generally coplanar relationship with said rotary vibratory conveyor for progressively feeding the group of confections from said wide linear conveyor over onto said rotary vibratory conveyor, and single-file guide means for guiding the confections single file away from said outlet.

References Cited by the Examiner

UNITED STATES PATENTS

| 636,103 | 10/98 | Bartel | 221—160 |
|---|---|---|---|
| 2,609,914 | 9/52 | Balsiger | 198—33 |
| 2,725,971 | 12/55 | Clark | 198—33 |
| 2,867,313 | 1/59 | Deshaw | 198—33 |
| 3,042,181 | 7/62 | Rise | 198—33 |
| 3,065,834 | 11/62 | Stahli | 198—33 |

FOREIGN PATENTS 699,364 11/53 Great Britain.

SAMUEL F. COLEMAN, *Primary Examiner.*

EDWARD A. SROKA, *Examiner.*